United States Patent
Haga (10) Patent No.: US 10,197,906 B2
(45) Date of Patent: Feb. 5, 2019

(54) PRISM UNIT, MANUFACTURING METHOD THEREFOR, AND IMAGE PROJECTION APPARATUS

(71) Applicant: KONICA MINOLTA, INC., Chiyoda-ku, Tokyo (JP)

(72) Inventor: Daisuke Haga, Osakasayama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/889,648

(22) Filed: Feb. 6, 2018

(65) Prior Publication Data
US 2018/0224736 A1 Aug. 9, 2018

(30) Foreign Application Priority Data
Feb. 7, 2017 (JP) .................. 2017-020532

(51) Int. Cl.
*G02B 5/04* (2006.01)
*G03B 33/12* (2006.01)
*G02B 27/12* (2006.01)

(52) U.S. Cl.
CPC ........... *G03B 33/12* (2013.01); *G02B 27/126* (2013.01); *G02B 5/04* (2013.01)

(58) Field of Classification Search
CPC ........ G03B 33/12; G02B 27/126; G02B 5/04; G02B 27/097
USPC ..................... 353/81; 359/831–837
See application file for complete search history.

(56) References Cited

U.S. PATENT DOCUMENTS 7,147,333 B2 * 12/2006 Shirota ................ G02B 7/1805
353/81

FOREIGN PATENT DOCUMENTS

JP 2009134209 A 6/2009

* cited by examiner

*Primary Examiner* — Ryan D Howard
(74) *Attorney, Agent, or Firm* — Cantor Colburn LLP (57) ABSTRACT

A prism unit includes: a color synthesizing prism; a fixing member having a linear expansion coefficient different from a linear expansion coefficient of the color synthesizing prism; and a first adhesive layer and a second adhesive layer, wherein the color synthesizing prism is adhered to the fixing member via the first adhesive layer and the second adhesive layer which are arranged in this order sequentially from the fixing member, and the second adhesive layer has a lower tensile strength than the first adhesive layer.

11 Claims, 11 Drawing Sheets

PRISM UNIT, MANUFACTURING METHOD THEREFOR, AND IMAGE PROJECTION APPARATUS

CROSS REFERENCE TO RELATED APPLICATION

The present application claims priority under 35 U.S.C. § 119 to Japanese Application No. 2017-020532 filed Feb. 7, 2017, the entire content of which is incorporated herein by reference.

BACKGROUND

Technological Field

The present invention relates to a prism unit used in an image projection apparatus such as a projector, a method of manufacturing the prism unit, and an image projection apparatus including the prism unit.

Description of the Related Art

In recent years, an image projection apparatus that uses a plurality of image display elements such as liquid crystal panels or digital micromirror devices (DMD; registered trademark) to project an image on a screen have become widespread. In this image projection apparatus, light (white light) emitted from a light source is incident on a color synthesizing prism via an illumination optical system and decomposed into red (R), green (G), and blue (B) light in the color synthesizing prism to be guided to each image display element. In each image display element, the incident illumination light of each color is modulated according to the image data and is emitted as image light (projection light). The image light of each color is synthesized by the color synthesizing prism and guided to a screen via a projection lens. As a result, the images displayed on the respective image display elements are synthesized and projected to be magnified on the screen.

The above-described color synthesizing prism is bonded and fixed to a fixing member connected to the illumination optical system via an adhesive. For example, in JP 2009-134209 A (refer to claim 1, paragraphs [0019], [0036] to [0041], and FIG. 13 to FIG. 17 etc.), in the configuration where a color synthesizing prism is mounted on a pedestal fixed on a base by screws, the color synthesizing prism is bonded to the pedestal via an adhesive.

As an adhesive for bonding the color synthesizing prism and the fixing member to each other, a hard adhesive is usually used in order to prevent the color synthesizing prism from moving after fixing to the fixing member. However, when the color synthesizing prism and the fixing member are adhered to each other with only a hard adhesive, that is, with only one type of adhesive, cracks (fissures) occur on the face on the adhesion side of the color synthesizing prism for adhesion to the fixing member when the environmental temperature changes, and furthermore, the color synthesizing prism may be broken so that it has been impossible to cope with the environmental temperature change beyond the present situation.

Here, the cause of occurrence of cracks and fractures in the color synthesizing prism is assumed as follows. That is, the color synthesizing prism and the fixing member are deformed (expanded or contracted) according to change of the environmental temperature. At this time, the color synthesizing prism and the fixing member have different linear expansion coefficients, so that there is a difference in the manner of deformation, and as a result, a stress (tensile stress/contraction stress) corresponding to the difference in linear expansion coefficients is generated. In this case, it is difficult to absorb the stress with a hard adhesive, so that the above stress generates minute cracks on the adhesive side face of the color synthesizing prism. Then, as this minute crack progresses and becomes larger, the color synthesizing prism breaks.

SUMMARY

The present invention has been made to solve the above problems, and an object thereof is to provide a prism unit capable of reducing cracks and fractures on a color synthesizing prism due to environmental temperature change, and a method of manufacturing the prism unit, and an image projection apparatus including the prism unit.

To achieve the abovementioned object, according to an aspect of the present invention, a prism unit reflecting one aspect of the present invention comprises: a color synthesizing prism; a fixing member having a linear expansion coefficient different from a linear expansion coefficient of the color synthesizing prism; and a first adhesive layer and a second adhesive layer, wherein the color synthesizing prism is adhered to the fixing member via the first adhesive layer and the second adhesive layer which are arranged in this order sequentially from the fixing member, and the second adhesive layer has a lower tensile strength than the first adhesive layer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the present specification, when a numerical range is expressed as a to b, the numerical range includes the values of the lower limit a and the upper limit b. In addition, the present invention is not limited to the following contents.

(Regarding Image Projection Apparatus)

Figure 1:
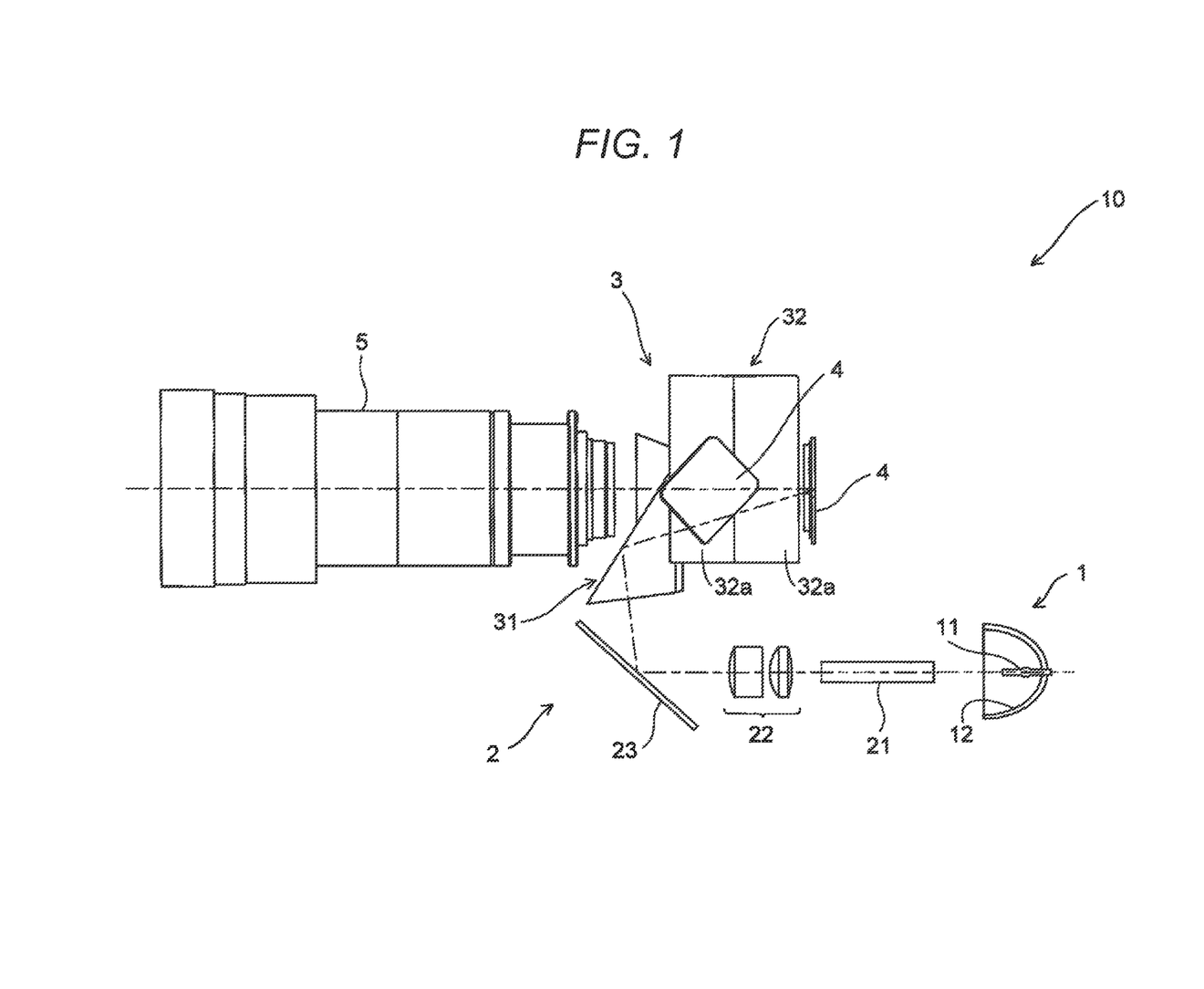
FIG. 1 is an explanatory diagram showing a schematic configuration of an image projection apparatus according to an embodiment of the present invention.

FIG. 1 is an explanatory diagram showing a schematic configuration of an image projection apparatus 10 according to the embodiment. The image projection apparatus 10 has a light source 1, an illumination optical system 2, a prism unit 3, image display elements 4, and a projection lens 5. Three image display elements 4 are provided in correspondence with the respective colors of red (R), green (G), and blue (B).

The light source 1 emits light (illumination light) for illuminating the image display element 4, and is composed of a light emitting section 11 and a reflector 12. The light emitting section 11 is composed of a discharge lamp that emits white light, for example. The reflector 12 is a reflecting plate that reflects the light emitted from the light emitting section 11 to guide the light to the illumination optical system 2, and has a spheroidal reflecting surface. The above light emitting section 11 is arranged at one focus position of the reflector 12.

The illumination optical system 2 is an optical system for guiding light from the light source 1 to each image display element 4, and includes a rod integrator 21, an illumination relay system 22, and a mirror 23. The rod integrator 21 equalizes the light amount distribution of the light from the light source 1 and then emits the light. The illumination relay system 22 relays an image on the light emission surface of the rod integrator 21 and projects the image on each image display element 4 to uniformly illuminate each image display element 4. The illumination relay system 22 is composed of a plurality of lenses. By collecting the light from the rod integrator 21 with a plurality of lenses, the utilization efficiency of the light can be improved. The mirror 23 reflects the light emitted from the illumination relay system 22 and guides the light to the prism unit 3.

The prism unit 3 has a TIR prism 31 and a color synthesizing prism 32. The TIR prism 31 is a total reflection prism (a critical angle prism) that totally reflects the illumination light incident from the illumination optical system 2 and also transmits the image light (projection light) from each image display element 4. By bending the optical path of the illumination light by the TIR prism 31, the image projection apparatus 10 can be made compact. The color synthesizing prism 32 decomposes the light from the TIR prism 31 into the R, G, and B color light, guides the light to each image display element 4, and synthesizes the reflected light (image light) from each image display element 4 on the same optical path. Such a color synthesizing prism 32 includes a plurality of glass prisms 32a. In this example, BK7 (linear expansion coefficient: 7.1 to $8.3 \times 10^{-6}/°$ C.) manufactured by Schott AG is used as a glass material constituting each glass prism 32a. On the face of one of the adjacent glass prisms 32a, a dichroic film that transmits predetermined color light and reflects other color light is formed.

Each image display element 4 is a display element which modulates incident light to display an image, and is composed of a digital micromirror device (DMD) for example. The DMD has a plurality of micromirrors corresponding to each pixel in a matrix state, and rotates each micromirror according to the image data, so as to reflect the image light corresponding to the image data ON to direct the light to the projection lens 5 and to reflect the light corresponding to the image data OFF to deviate the light from the direction toward the projection lens 5.

In the above configuration, the light (white light) emitted from the light source 1 enters the TIR prism 31 of the prism unit 3 via the illumination optical system 2 to be totally reflected there, and then is decomposed into respective RGB color light by the color synthesizing prism 32. Each color light enters the corresponding image display element 4 and is modulated according to the image data there. Image light (light corresponding to the image data ON) from each image display element 4 enters the color synthesizing prism 32 to be combined there, and is transmitted through the TIR prism 31 to be guided to the projection plane (a screen, for example) through the projection lens 5. As a result, the images of the respective colors displayed on the respective image display elements 4 are synthesized, magnified and projected on the projection plane. It should be noted that the projection plane may be a wall.

(Regarding the Details of the Prism Unit)

Figure 2:
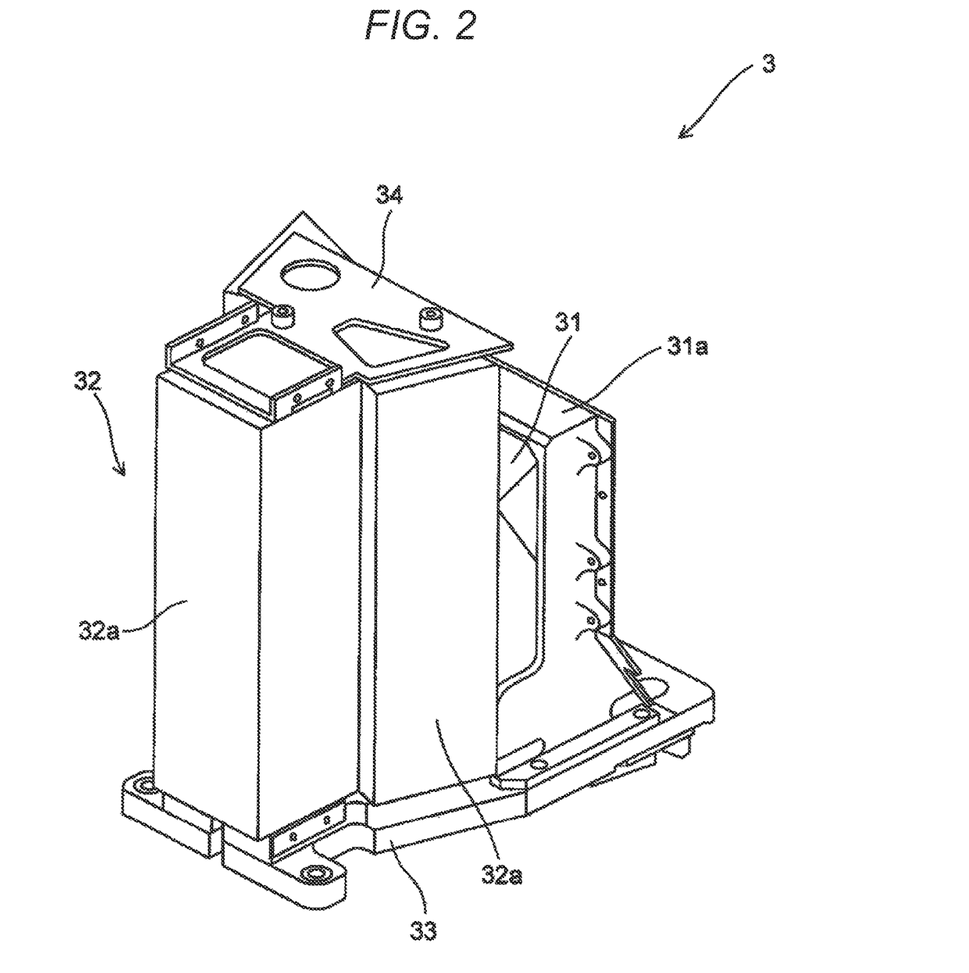
FIG. 2 is a perspective view showing an appearance of a prism unit included in the image projection apparatus.
Figure 3:
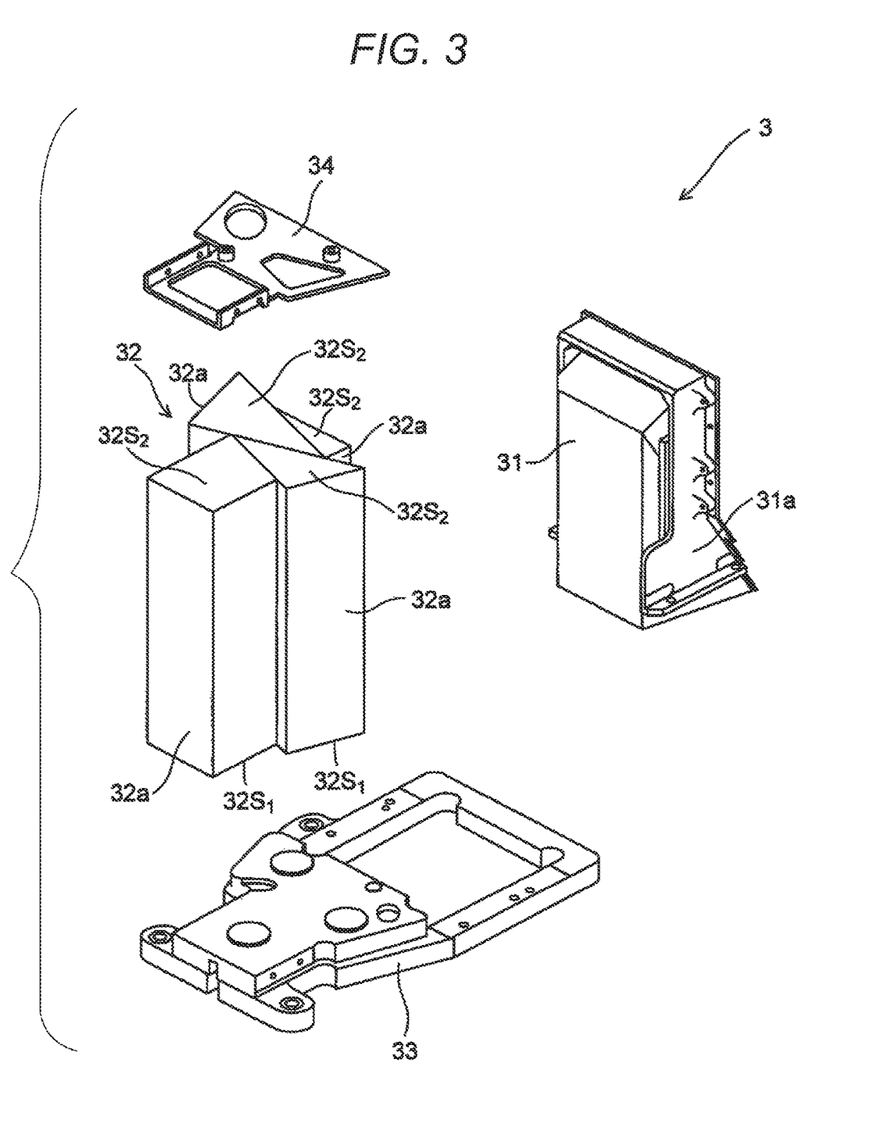
FIG. 3 is an exploded perspective view of the prism unit.

FIG. 2 is a perspective view showing the appearance of the prism unit 3, and FIG. 3 is an exploded perspective view of the prism unit 3 of FIG. 2. The prism unit 3 has a fixing member 33 and a top plate 34 in addition to the TIR prism 31 and the color synthesizing prism 32 described above. The fixing member 33 and the top plate 34 are made of metal such as SUS430 (stainless steel), for example. The linear expansion coefficient of SUS430 is $10.4 \times 10^{-6}/°$ C. Therefore, it can be said that the fixing member 33 and the top plate 34 are more expansive or contractive than the color synthesizing prism 32 (the glass prism 32a) with respect to a change in the environmental temperature because the linear expansion coefficient is larger than that of the color synthesizing prism 32.

The fixing member 33 holds the TIR prism 31 and the color synthesizing prism 32. The top plate 34 is disposed on the opposite side of the color synthesizing prism 32 from the fixing member 33 and covers the upper face of the color synthesizing prism 32. The TIR prism 31 is screwed to the fixing member 33 via a holding member 31a.

Here, in the color synthesizing prism 32, a face $32S_1$ facing the fixing member 33 and a face $32S_2$ facing the top plate 34 are in a ground-glass state, having sand surfaces. In the embodiment, the abovementioned faces $32S_1$ and $32S_2$ satisfy at least one of (1) the surface roughness Ra is 0.8 to 2 μm, and (2) the maximum height Ry is 5 to 20 μm. In this case, strength can be given to the faces $32S_1$ and $32S_2$ by surface irregularities. This makes it difficult for the face $32S_1$ to be scratched when fixing the color synthesizing prism 32 to the fixing member 33. Similarly, when the color synthesizing prism 32 is fixed to the top plate 34, the face $32S_2$ is less likely to be scratched.

Figure 4:
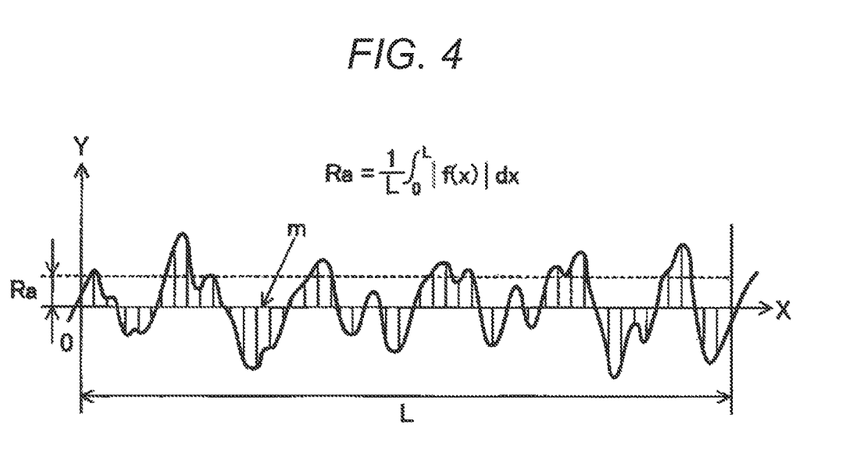
FIG. 4 is an explanatory diagram showing a surface roughness Ra.

The surface roughness Ra is also called the arithmetic average roughness and the maximum height Ry is also called the maximum height Rmax or Rz, both of which are defined in JIS B 0601-1994 or JIS B 0601-2001. That is, as shown in FIG. 4, the surface roughness Ra is obtained by expressing the value of the equation in FIG. 4 in micrometers (μm) when only the reference length L in the direction of the average line m of the roughness curve is extracted, the X axis is set in the direction of the average line m of the extracted portion, and the Y axis is set in the direction of the longitudinal magnification, and then the roughness curve is expressed by y=f(x).

Figure 5:
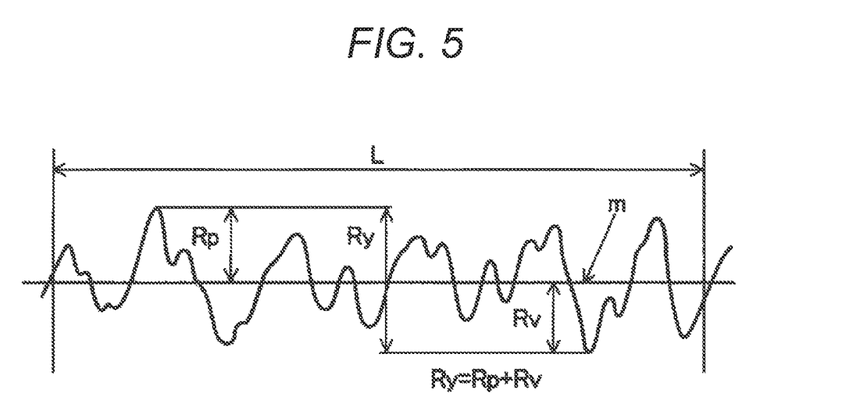
FIG. 5 is an explanatory diagram showing a maximum height Ry.

Further, as shown in FIG. 5, the maximum height Ry is obtained by extracting the reference length L in the direction of the average line m of the roughness curve, measuring the distance (Ry) between the summit line and the valley line of the extracted portion in the direction of the longitudinal magnification of the roughness curve, and expressing this value in micrometers (μm).

Figure 6:
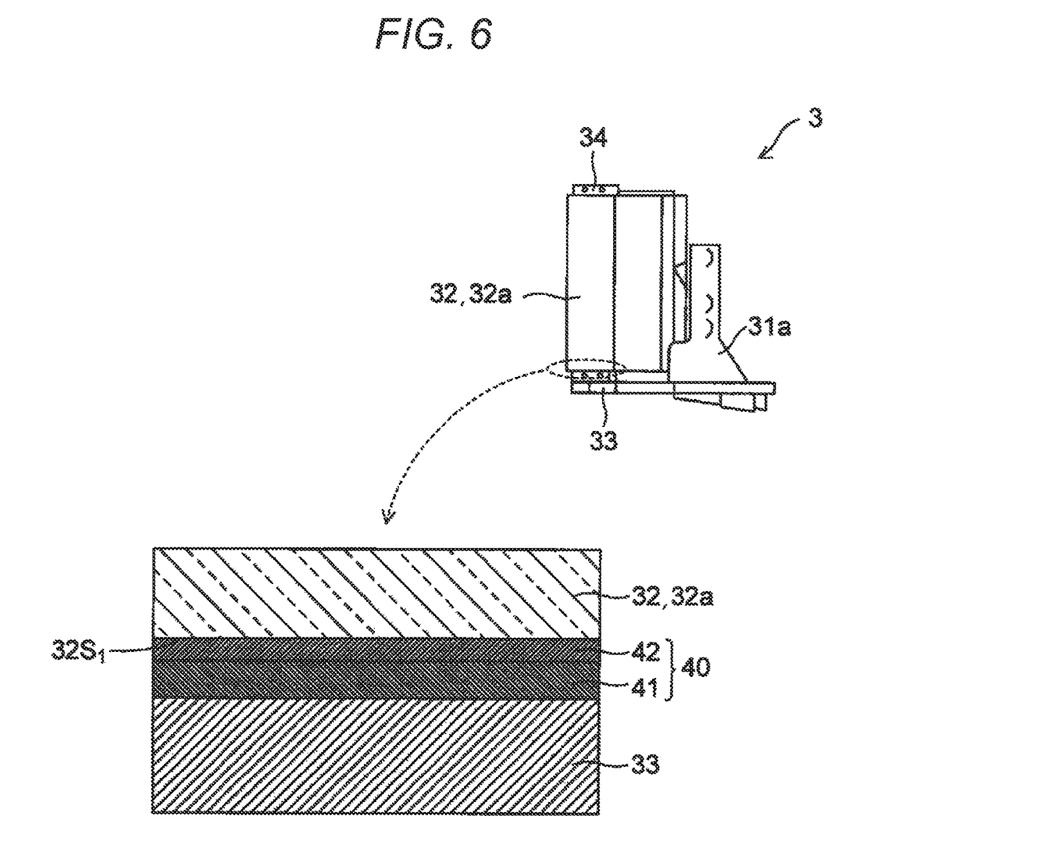
FIG. 6 is a diagram showing a side view of the prism unit together with an enlarged cross-sectional view of an adhering portion between the color synthesizing prism and the fixing member in the prism unit.

FIG. 6 shows a side view of the prism unit 3 together with an enlarged cross-sectional view of an adhering portion between the color synthesizing prism 32 and the fixing member 33 in the prism unit 3. The color synthesizing prism 32 is adhered to the fixing member 33 via an adhesive layer 40. The adhesive layer 40 is composed of a first adhesive layer 41 and a second adhesive layer 42 which are arranged in this order sequentially from the fixing member 33.

The first adhesive layer 41 is made of DP460EG (two-component epoxy room temperature curable adhesive manufactured by 3M Company) for example. The hardness of the DP460EG is D78 in Shore hardness. Incidentally, the Shore hardness is a hardness determined from the repulsion height of a weight with a diamond indenter dropped on a test piece from a certain height and can be obtained by a test method in accordance with JIS Z 2246.

The second adhesive layer 42 is made of Epora #2000 (two-component weak solvent modified epoxy resin paint manufactured by Nihon Tokushu Toryo Co., Ltd.) for example. The second adhesive layer 42 may be a resin or a paint having adhesiveness, and other substances such as charcoal (carbon) may be contained in the above-described resin or paint. The above Epora #2000 can be handled as a resin or can be handled as a paint.

The second adhesive layer 42 is desirably a resin or paint having excellent adhesion to the color synthesizing prism 32. The above Epora #2000 is excellent in adhesion to glass and is suitable as a resin or paint constituting the second adhesive layer 42. Further, from the viewpoint of promoting curing by heating, the second adhesive layer 42 is desirably a resin or paint having heat resistance. In this respect, Epora #2000 mentioned above can be said to be a heat-resistant resin or paint because Epora #2000 exhibits good adhesiveness even if being heated at a temperature of 100 to 120° C. and cured in a short time. Since the epoxy resin is cured even at room temperature, heat resistance is not required for the second adhesive layer 42 as long as hardening promotion by heating is not performed. That is, the second adhesive layer 42 does not have to have heat resistance. The second adhesive layer 42 is desirably a resin or paint that is softer than the first adhesive layer 41 from the viewpoint of promoting emergence of the function effect of this embodiment described later.

Figure 7:
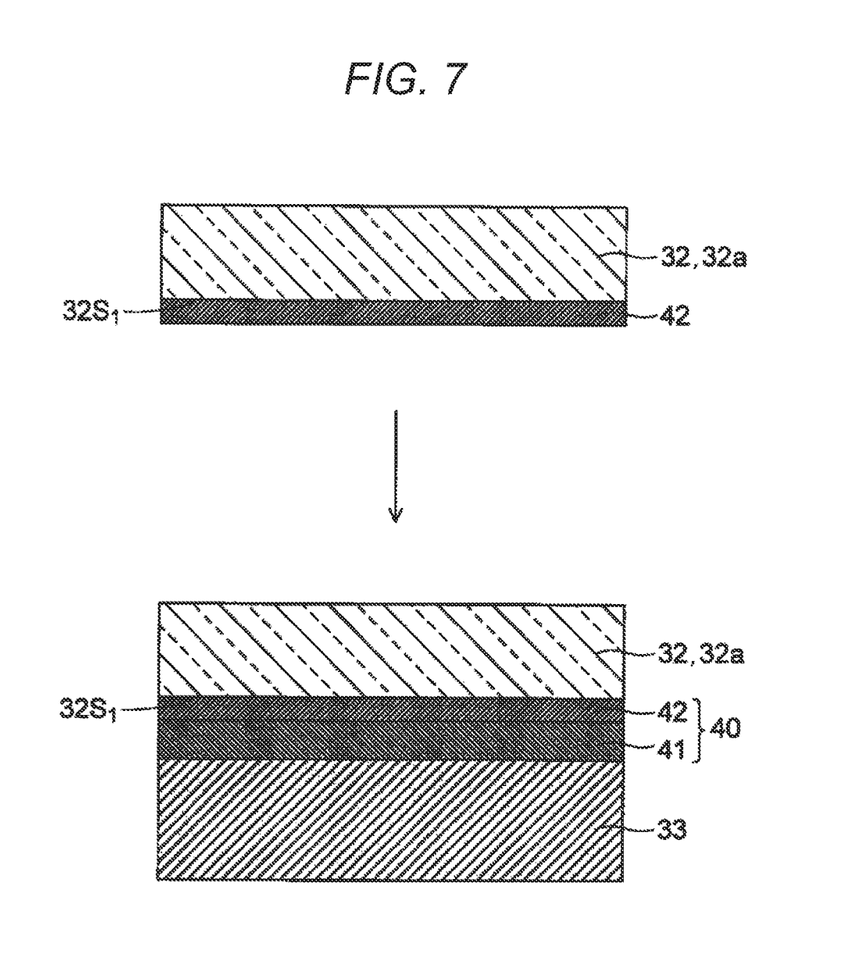
FIG. 7 is a cross-sectional view showing a manufacturing process of the prism unit.

The prism unit 3 described above can be manufactured as follows. First, as shown in FIG. 7, the second adhesive layer 42 is formed on the face $32S_1$ on the adhesion side of the color synthesizing prism 32 for adhesion to the fixing member 33 (S1; second adhesive layer forming step). For example, the second adhesive layer 42 can be formed by applying Epora #2000 to the face $32S_1$ of the color synthesizing prism 32 and heating the Epora #2000 at 100 to 120° C. for hardening. In addition, the second adhesive layer 42 may be formed by natural curing (room temperature curing) of Epora #2000.

Next, the color synthesizing prism 32 having the second adhesive layer 42 formed thereon is bonded to the fixing member 33 via the second adhesive layer 42 and the first adhesive layer 41 (S2: bonding step). As the above-mentioned first adhesive layer 41, DP460EG described above can be used. Thereafter, the holding member 31a holding the TIR prism 31 is screwed to the fixing member 33. Thereby, the prism unit 3 is completed.

(Regarding the Tensile Strength of the First Adhesive Layer and the Second Adhesive Layer)

In the embodiment, the second adhesive layer 42 has lower tensile strength than the first adhesive layer 41. Thus, the first adhesive layer 41 is relatively hard (hard to be broken) and the second adhesive layer 42 is relatively fragile (easily broken).

Here, the tensile strength represents the strength of a material when a tensile force is applied to the material. In general, the tensile strength is defined as a value obtained by dividing the maximum load withstood until the test piece breaks by the original cross-sectional area of the test piece when a rod-shaped test piece is pulled in the axial direction in a tensile test. However, here the tensile load when the material broke while the material was pulled in the direction perpendicular to the cross section by a simple test to be described later was taken as the tensile strength assuming that the cross-sectional area of the bonding surface of the material was fixed (for example, the bonding surface is a circle with a diameter of 6 mm). Incidentally, when the first adhesive layer 41 was made of DP460EG and the second adhesive layer 42 was made of Epora #2000, the tensile strength of the first adhesive layer 41 was about 300 N and the tensile strength of the second adhesive layer 42 was about 240 N from the test which will be described later.

Figure 8:
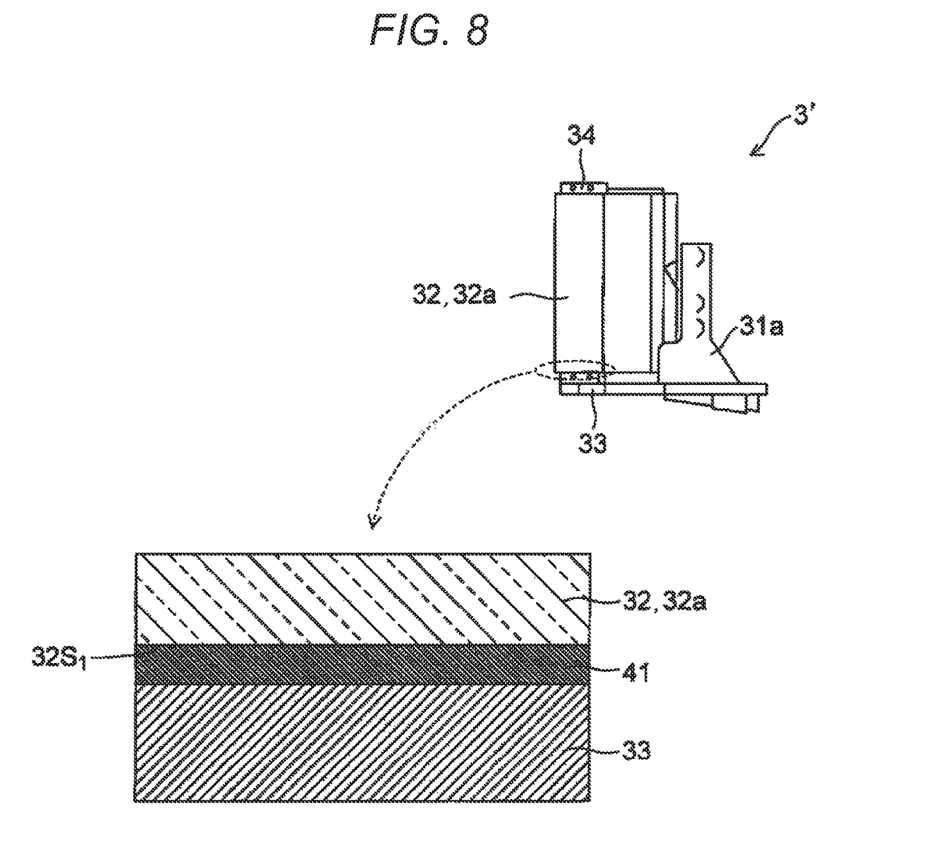
FIG. 8 is a diagram showing a side view of a prism unit of a reference example together with an enlarged cross-sectional view of an adhering portion between a color synthesizing prism and a fixing member in the prism unit.

FIG. 8 shows a side view of the prism unit 3' of the reference example together with an enlarged cross-sectional view of the adhering portion between the color synthesizing prism 32 and the fixing member 33 in the prism unit 3'. In the prism unit 3' of the reference example, the color synthesizing prism 32 is adhered to the fixing member 33 via only the first adhesive layer 41 formed of DP460EG.

When the environmental temperature changes, the color synthesizing prism 32 and the fixing member 33 are distorted (expanded or contracted). At this time, since the linear expansion coefficients of the color synthesizing prism 32 and the fixing member 33 are different from each other as described above, a stress (tensile stress/contraction stress) is generated in accordance with the difference in linear expansion coefficients between the color synthesizing prism 32 and the fixing member 33 when the environmental temperature changes. In the configuration of the reference example in which the color synthesizing prism 32 and the fixing member 33 are adhered via only the hard adhesive layer (the first adhesive layer 41), since it is difficult to absorb the stress by the first adhesive layer 41 when the environmental temperature changes, minute cracks (fissures) are generated on the face $32S_1$ on the adhesion side of the color synthesizing prism 32 for adhesion to the fixing member 33 due to the abovementioned stress. Then, as this minute crack progresses and becomes larger, the color synthesizing prism 32 breaks.

On the other hand, as shown in FIG. 6 and the like, in the configuration of the embodiment in which the color synthesizing prism 32 is bonded to the fixing member 33 via the second adhesive layer 42 and the first adhesive layer 41, since the second adhesive layer 42 has lower tensile strength and is more fragile than the first adhesive layer 41, the above-mentioned stress which is difficult to absorb by the relatively hard first adhesive layer 41 can be absorbed by the second adhesive layer 42 when the environmental temperature changes. In other words, since the second adhesive layer 42 is fragile, a partial molecular structure of the resin is easily broken or destroyed when a stress is applied, so that the stress can be absorbed by such partial breakage or destruction. Thus, it is possible to reduce the influence (damage) on the color synthesizing prism 32 and to reduce cracks and fractures on the color synthesizing prism 32 at the time of environmental temperature change. Accordingly, it is not necessary to narrow the temperature range of the use environment in order to suppress cracks and fractures of the color synthesizing prism 32.

In other words, according to the configuration of the prism unit 3 of the embodiment, it is possible to reduce cracks and fractures on the color synthesizing prism 32 due to the temperature change of the use environment, and also to expand the temperature range of the use environment as compared with the prism unit 3' of the reference example. Conversely, when the temperature range of the use environment is fixed, even if the fixing member 33 is made of a metal having a larger linear expansion coefficient than SUS430, for example, a stress caused by a difference in linear expansion coefficient can be absorbed by the second adhesive layer 42, and cracks and fractures on the color synthesizing prism 32 can be reduced, so that the range of material selection for the metal constituting the fixing member 33 can be expanded.

Hereinafter, a method of measuring the tensile strength of the first adhesive layer 41 and the second adhesive layer 42 will be described.

[Tensile Strength Measurement of the First Adhesive Layer]

Figure 9:
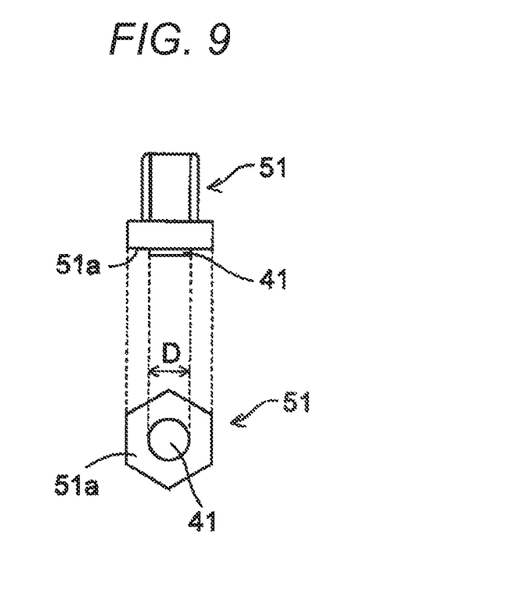
FIG. 9 is a diagram showing a side view and a bottom view of a hexagon bolt together.
Figure 10:
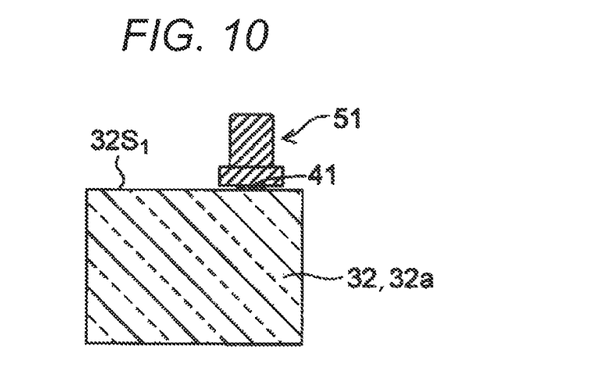
FIG. 10 is an explanatory diagram showing a state in which the hexagon bolt is adhered to a color synthesizing prism via a first adhesive layer.
Figure 11:
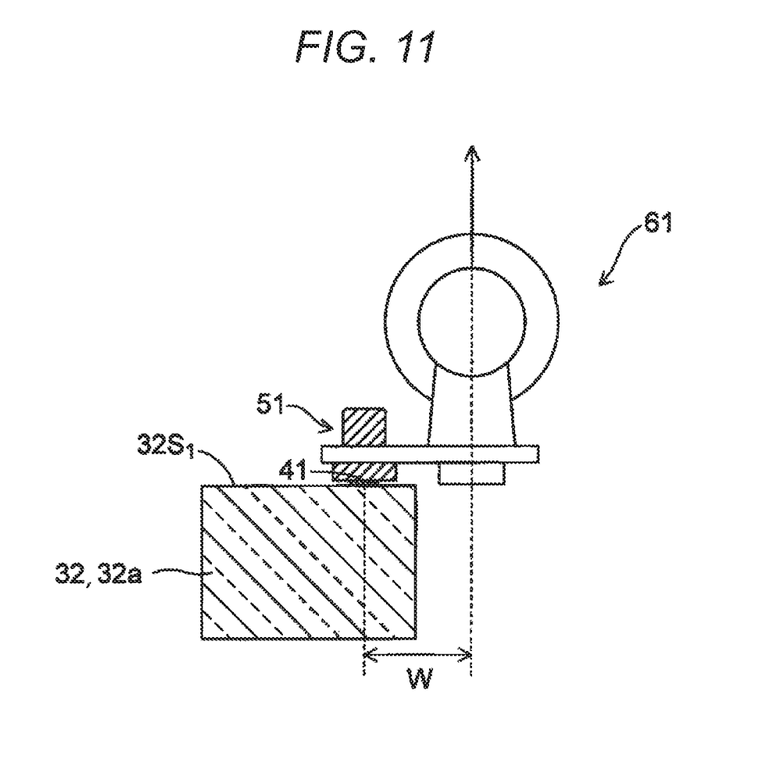
FIG. 11 is an explanatory diagram showing how the tensile strength of the first adhesive layer is measured.

As shown in FIG. 9, a hexagon bolt 51 made of stainless steel (SUS430) was prepared and a DP460EG, which constitutes the first adhesive layer 41, was applied to a face 51a on the adhesion side of the hexagon bolt 51 for adhesion to the color synthesizing prism 32. The diameter D of the application region (adhesion region) of DP460EG was 6 mm in plan view. Then, as shown in FIG. 10, the hexagon bolt 51 and the color synthesizing prism 32 were adhered to each other via the first adhesive layer 41 having a thickness of 50 μm. Next, as shown in FIG. 11, a tensile strength (load) when the hexagon bolt 51 peeled off from the color synthesizing prism 32 by pulling in the axial direction of the hexagon bolt 51 at a position shifted by a separation distance W=20 mm from the first adhesive layer 41 was measured with a push-pull gauge 61. As a result, the tensile strength was 306.1 N. Incidentally the separation distance W is a distance from the center of the adhesion region of the first adhesive layer 41 in a direction perpendicular to the axial direction of the hexagon bolt 51 (the same definition is also applied below).

The fracture surface made when the hexagon bolt 51 was peeled off from the color synthesizing prism 32 was formed in the first adhesive layer 41 (a midway position in the thickness direction), between the first adhesive layer 41 and the color synthesizing prism 32, or between the first adhesive layer 41 and the hexagon bolt 51. Thus, it can be said that the above tensile strength (306.1 N) is the tensile strength when the first adhesive layer 41 is fractured or destroyed.

[Tensile Strength Measurement of the Second Adhesive Layer]

Figure 12:
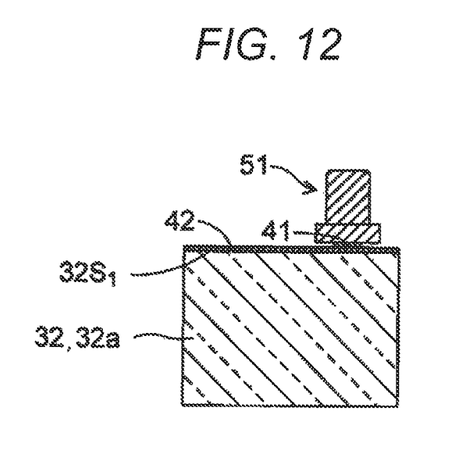
FIG. 12 is an explanatory diagram showing a state in which the hexagon bolt is adhered to the color synthesizing prism via the first adhesive layer and a second adhesive layer.
Figure 13:
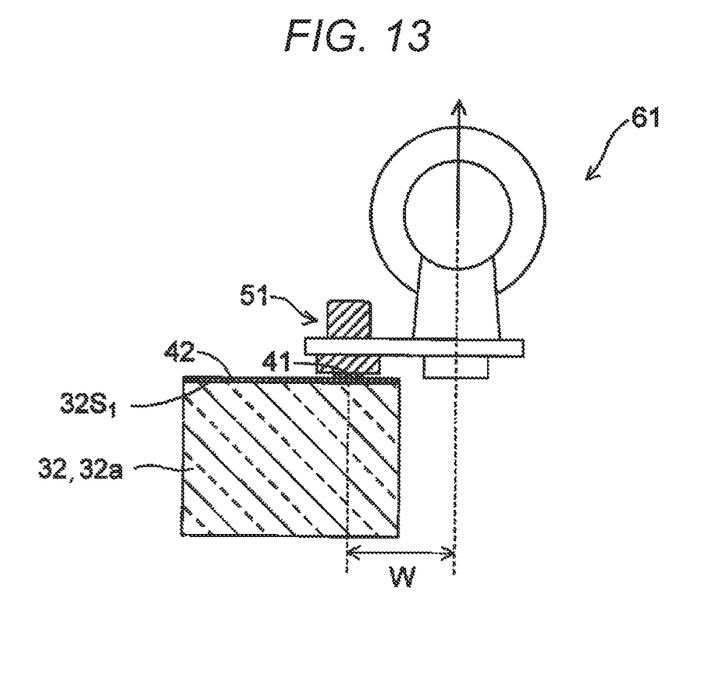
FIG. 13 is an explanatory diagram showing how the tensile strength of the second adhesive layer is measured.

As shown in FIG. 12, Epora #2000 constituting the second adhesive layer 42 was applied to the face $32S_1$ on the adhesion side of the color synthesizing prism 32 for adhesion to the hexagon bolt 51, and cured. At this time, the thickness of the second adhesive layer 42 was 25 μm. Next, the hexagon bolt 51 (with the first adhesive layer 41) similar to that in FIG. 9 was used, and the hexagon bolt 51 and the second adhesive layer 42 were bonded to each other via the first adhesive layer 41. The diameter of the bonding region of the first adhesive layer 41 was 6 mm in a plan view and the thickness of the first adhesive layer 41 was 50 μm. Thereafter, as shown in FIG. 13, the tensile strength (load) when the hexagon bolt 51 was peeled off from the color synthesizing prism 32 by pulling in the axial direction of the hexagon bolt 51 at a position shifted by a separation distance W=20 mm from the first adhesive layer 41 was measured with the push-pull gauge 61. As a result, the tensile strength was 243.1 N.

The fracture surface made when the hexagon bolt 51 was peeled off from the color synthesizing prism 32 was formed in the second adhesive layer 42 (a midway position within the thickness), between the second adhesive layer 42 and the color synthesizing prism 32, or between the second adhesive layer 42 and the first adhesive layer 41. Thus, it can be said that the above tensile strength (243.1 N) is the tensile strength when the second adhesive layer 42 is fractured or destroyed.

(Regarding the Thicknesses of the First Adhesive Layer and the Second Adhesive Layer)

For example, a soft material having a relatively low hardness tends to break easily against tension as compared with a hard material having a relatively high hardness. Accordingly, it can be said that a soft material has lower tensile strength than a hard material. Hence, for example, when the second adhesive layer 42 is made of a soft material having low tensile strength and the first adhesive layer 41 is made of a hard material having high tensile strength, if the second adhesive layer 42 is too thick as compared with the first adhesive layer 41, deformation (distortion) of the second adhesive layer 42 that absorbs the above-mentioned stress tends to be large at the time of deformation of the fixing member 33 (at the time of expanding or contracting) due to environmental temperature change. In this case, there is a possibility that the color synthesizing prism 32 in direct contact with the second adhesive layer 42 tilts or shifts in position. The displacement of the color synthesizing prism 32 is undesirable because it causes deterioration in image quality such as positional shift of the image projected through the color synthesizing prism 32. In addition, if the deformation of the second adhesive layer 42 becomes large, the second adhesive layer 42 itself may be broken.

Accordingly, the second adhesive layer 42 is desirably thinner than the first adhesive layer 41. For example, when the thickness of the first adhesive layer 41 is 50 μm, the thickness of the second adhesive layer 42 is desirably 5 to 40 μm. Thus, by making the second adhesive layer 42 thinner than the first adhesive layer 41 as described above, even if the second adhesive layer 42 is made of a soft material having low tensile strength and the first adhesive layer 41 is made of a hard material having high tensile strength, it is possible to suppress the deformation of the second adhesive layer 42 when environmental temperature changes, to suppress the displacement of the color synthesizing prism 32 in contact with the second adhesive layer 42, and to suppress the deterioration of the image quality of the projected image. Further, by suppressing the deformation of the second adhesive layer 42, the breakage of the second adhesive layer 42 can be suppressed, so that falling of the color synthesizing prism 32 from the fixing member 33 due to breakage of the second adhesive layer 42 can also be avoided.

In addition, in the case where the second adhesive layer 42 is made of a soft material having low tensile strength, and the first adhesive layer 41 is made of a hard material having high tensile strength, when the thickness of the second adhesive layer 42 is equal to or greater than 50 μm that is the thickness of the first adhesive layer 41, the distortion of the second adhesive layer 42 tends to become large when the fixing member 33 is deformed by environmental temperature change due to increase of the thickness of the soft second adhesive layer 42 so that displacement or the like of the color synthesizing prism 32 is likely to occur as described above. Thus, the upper limit of the thickness of the second adhesive layer 42 is desirably 40 μm which is surely smaller than the thickness of the first adhesive layer 41 (50 μm) as described above.

On the other hand, the surface roughness Ra of the face $32S_1$ of the color synthesizing prism 32 is about 2 μm at the maximum as described above, but if the second adhesive layer 42 is too thin, the second adhesive layer 42 enters recesses on the surface of the face $32S_1$, and consequently, it is feared that the condition becomes substantially equivalent to the state shown in FIG. 8 in which the color synthesizing prism 32 is adhered to the fixing member 33 without the second adhesive layer 42 therebetween (with only the first adhesive layer 41). Hence, the lower limit of the thickness of the second adhesive layer 42 is desirably 5 μm which is larger than the maximum value of the surface roughness Ra (2 μm) of the face $32S_1$ with a margin as described above from the viewpoint that the surface over the face $32S_1$ of the color synthesizing prism 32 may be flattened by using the second adhesive layer 42, and the thick second adhesive layer 42 may be reliably formed between the face $32S_1$ and the first adhesive layer 41.

(Regarding the Adhesion Between the Color Synthesizing Prism and the Top Plate)

Figure 14:
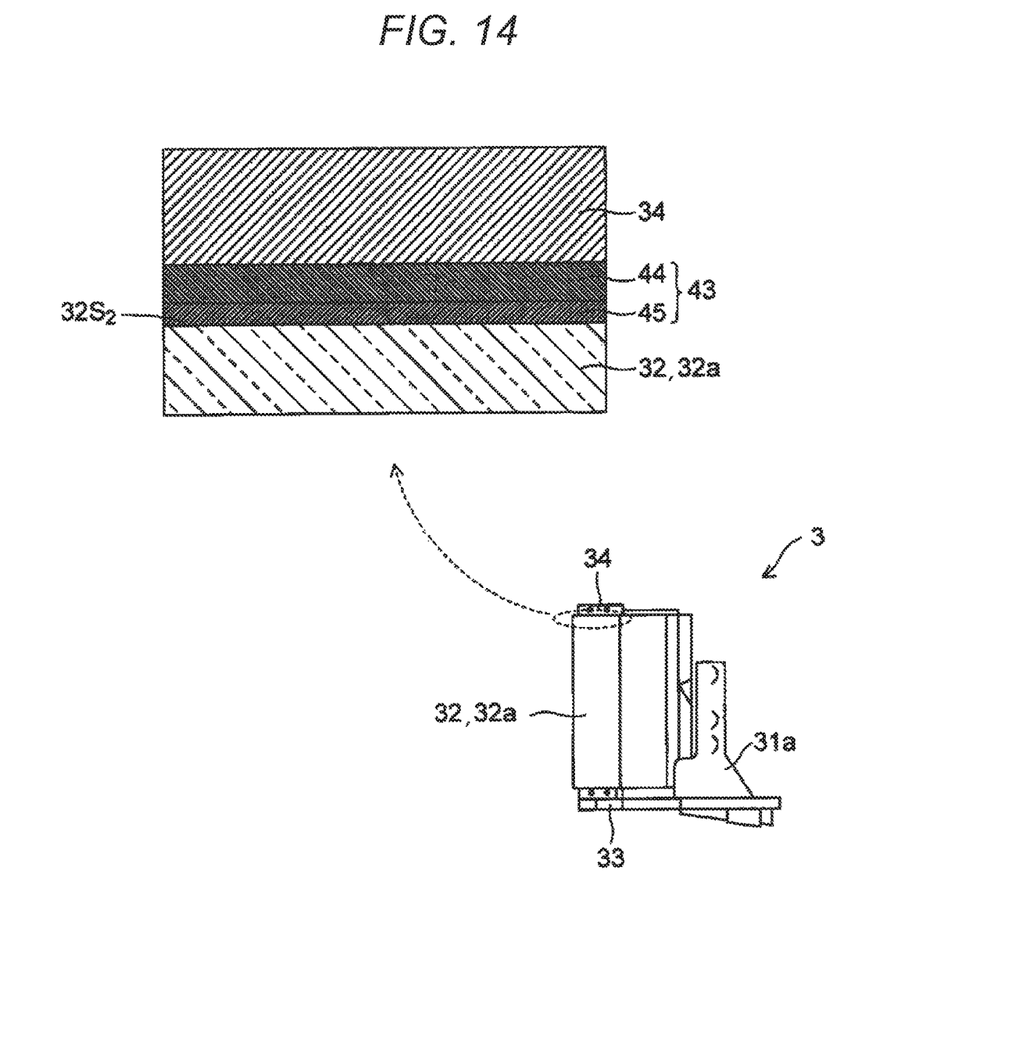
FIG. 14 is a diagram showing a side view of a prism unit included in the image projection apparatus together with an enlarged cross-sectional view of an adhering portion between the color synthesizing prism and the top plate in the prism unit.

FIG. 14 shows a side view of the prism unit 3 of the embodiment together with an enlarged cross-sectional view of the adhering portion between the color synthesizing prism 32 and the top plate 34 in the prism unit 3. The color synthesizing prism 32 is adhered to the top plate 34 via an adhesive layer 43. The adhesive layer 43 is composed of a third adhesive layer 44 and a fourth adhesive layer 45 which are arranged in this order sequentially from the top plate 34. The third adhesive layer 44 is made of the same material as the first adhesive layer 41 (for example, DP460EG). The fourth adhesive layer 45 is made of the same material as the second adhesive layer 42 (for example, Epora #2000). As a result, the fourth adhesive layer 45 has a lower tensile strength than the third adhesive layer 44. The thicknesses and the preferable ranges of the thicknesses of the third adhesive layer 44 and the fourth adhesive layer 45 can be the same as the respective thicknesses and the preferable ranges of the thicknesses of the first adhesive layer 41 and the second adhesive layer 42.

Since the linear expansion coefficients of the color synthesizing prism 32 and the top plate 34 are different from each other, a stress (tensile stress/contraction stress) is generated between the color synthesizing prism 32 and the top plate 34 due to a difference in linear expansion coefficients when the environmental temperature changes. In the configuration in which the color synthesizing prism 32 is adhered to the top plate 34 via the fourth adhesive layer 45 and the third adhesive layer 44 as described above, since the tensile strength of the fourth adhesive layer 45 is lower than that of the third adhesive layer 44, the above-mentioned stress generated when the environmental temperature changes, that is, the stress which is difficult for the relatively hard third adhesive layer 44 to absorb can be absorbed by the relatively fragile fourth adhesive layer 45. Thus, cracks and fractures of the color synthesizing prism 32 due to the above stress at the time of environmental temperature change, namely stress caused by deformation (expansion/contraction) of the top plate 34 can be reduced.

(Supplementary Note)

In the embodiment, the fixing member 33 is made of a metal (for example, SUS430). This makes it possible to couple the fixing member 33 to the illumination optical system 2 and hold the prism unit 3 and the illumination optical system 2 integrally.

In addition, the color synthesizing prism 32 includes a plurality of glass prisms 32a. Since the metal and glass have different linear expansion coefficients as described above, in the prism unit 3 in which the metallic fixing member 33 and the glass prism 32a (color synthesizing prism 32) are bonded to each other, the above-described stress which causes cracks and fractures on the color synthesizing prism 32 is surely generated when the environmental temperature changes. Accordingly, the above-described configuration where the above stress is absorbed and cracks and fractures of the color synthesizing prism 32 are reduced by providing the second adhesive layer 42 is extremely effective in the configuration where the metallic fixing member 33 and the color synthesizing prism 32 including the glass prism 32a are joined.

Further, the method for manufacturing the prism unit 3 of the embodiment include a step of forming the second adhesive layer 42 (having relatively low tensile strength) on the face $32S_1$ on the adhesion side of the color synthesizing prism 32 for adhesion to the fixing member 33, as shown in FIG. 7 and, a step of bonding the color synthesizing prism 32 to the fixing member 33 via the second adhesive layer 42 and the first adhesive layer 41 (having relatively high tensile strength). Thereby, the prism unit 3 capable of reducing cracks and fractures of the color synthesizing prism 32 due to the temperature change in the use environment can be achieved.

In addition, the image projection apparatus 10 of the embodiment has a configuration including the above-described prism unit 3. In particular, the image projection apparatus 10 further includes the light source 1 and the image display elements 4 corresponding to a plurality of colors, and while decomposing light emitted from the light source 1 into each color light and guiding the light to each image display element 4, the color synthesizing prism 32 of the prism unit 3 synthesizes image light of each color emitted from each image display element 4 and emits the synthesized image light (toward the projection lens 5). According to the prism unit 3 of the embodiment, cracks and fractures of the color synthesizing prism 32 can be reduced even when the environmental temperature changes, so that the image projection apparatus 10 with high reliability can be achieved by configuring the image projection apparatus 10 using the prism unit 3.

The prism unit of the present invention can be used in an image projection apparatus, for example.

Although embodiments of the present invention have been described and illustrated in detail, the disclosed embodiments are made for purposes of illustration and example only and not limitation. The scope of the present invention should be interpreted by terms of the appended claims.

What is claimed is:

1. A prism unit comprising:
   a color synthesizing prism;
   a fixing member having a linear expansion coefficient different from a linear expansion coefficient of the color synthesizing prism; and
   a first adhesive layer and a second adhesive layer,
   wherein the color synthesizing prism is adhered to the fixing member via the first adhesive layer and the second adhesive layer which are arranged in this order sequentially from the fixing member, and
   the second adhesive layer has a lower tensile strength than the first adhesive layer.

2. The prism unit according to claim 1, wherein the second adhesive layer is thinner than the first adhesive layer.

3. The prism unit according to claim 1, wherein a thickness of the second adhesive layer is 5 to 40 μm.

4. The prism unit according to claim 1, wherein a face facing the fixing member is in a ground-glass state on the color synthesizing prism, and satisfies at least one of (1) a surface roughness Ra is 0.8 to 2 μm, and (2) a maximum height Ry is 5 to 20 μm.

5. The prism unit according to claim 1, wherein the second adhesive layer is a resin or paint having heat resistance.

6. The prism unit according to claim 1, wherein the fixing member is made of a metal.

7. The prism unit according to claim 1, wherein the color synthesizing prism includes a plurality of glass prisms.

8. The prism unit according to claim 1, further comprising:
   a top plate disposed on an opposite side of the color synthesizing prism from the fixing member and having a linear expansion coefficient different from a linear expansion coefficient of the color synthesizing prism; and
   a third adhesive layer and a fourth adhesive layer,
   wherein the color synthesizing prism is adhered to the top plate via the third adhesive layer and the fourth adhesive layer which are arranged in this order sequentially from the top plate, and
   the fourth adhesive layer has a lower tensile strength than the third adhesive layer.

9. A method for manufacturing the prism unit according to claim 1, comprising:
   forming the second adhesive layer on a face on an adhesion side of the color synthesizing prism for adhesion to the fixing member, and
   bonding the color synthesizing prism to the fixing member via the second adhesive layer and the first adhesive layer.

10. An image projection apparatus comprising the prism unit according to claim 1.

11. The image projection apparatus according to claim 10, further comprising:
    a light source; and
    a plurality of image display elements corresponding to a plurality of colors,
    wherein while decomposing light emitted from the light source into light of each color and guiding the light to each of the image display elements, the color synthesizing prism of the prism unit synthesizes and emits the image light of each color emitted from each of the image display elements.

* * * * *